(12) United States Patent
Kollmann et al.

(10) Patent No.: US 12,336,523 B1
(45) Date of Patent: Jun. 24, 2025

(54) LIVEWELL SYSTEM AND METHOD

(71) Applicant: Brunswick Corporation, Mettawa, IL (US)

(72) Inventors: Troy J. Kollmann, New Smyrna Beach, FL (US); Trevor George, Savoy, IL (US); Simon H. McFarland, Comber (IE)

(73) Assignee: Brunswick Corporation, Mettawa, IL (US)

( * ) Notice: Subject to any disclaimer, the term of this patent is extended or adjusted under 35 U.S.C. 154(b) by 250 days.

(21) Appl. No.: 17/666,761

(22) Filed: Feb. 8, 2022

(51) Int. Cl.
A01K 97/20 (2006.01)
F25B 21/02 (2006.01)
F25D 17/02 (2006.01)
G05D 23/19 (2006.01)

(52) U.S. Cl.
CPC ............. A01K 97/20 (2013.01); F25B 21/02 (2013.01); F25D 17/02 (2013.01); G05D 23/1931 (2013.01); F25D 2700/12 (2013.01); F25D 2700/14 (2013.01)

(58) Field of Classification Search
CPC ............................ F25B 21/02; G05D 23/1931
See application file for complete search history.

(56) References Cited

U.S. PATENT DOCUMENTS

| 4,748,765 A | 6/1988 | Martin |
| 4,945,672 A | 8/1990 | Raia |
| 5,172,511 A | 12/1992 | Smith et al. |
| 5,309,868 A | 5/1994 | Tomiyama |
| 5,544,489 A | 8/1996 | Moren |
| 6,044,901 A * | 4/2000 | Basala ................. B63B 35/26 165/41 |
| 6,962,019 B1 | 11/2005 | McDougle |
| 7,024,814 B1 | 4/2006 | McDougle |
| 7,134,293 B2 | 11/2006 | Rabal |

(Continued)

OTHER PUBLICATIONS

Industrial Water Chiller, ProCool IIV—Water Recirculator, admitted prior art, available at https://industrialwaterchiller.com/product/01ton-3/, last accessed Oct. 26, 2021.

(Continued)

Primary Examiner — Ana M Vazquez
(74) Attorney, Agent, or Firm — Andrus Intellectual Property Law, LLP

(57) ABSTRACT

A livewell system for a marine vessel includes a tank configured to hold water, a fill pump configured to pump water into the tank from a body of water in which the marine vessel is located, and a recirculation pump configured to pump water out of the tank and subsequently back into the tank. A first temperature sensor senses a temperature of the water in the body of water, and a second temperature sensor senses a temperature of the water in the tank. A controller is provided in signal communication with the fill pump, the recirculation pump, and the first and second temperature sensors. The controller operates the fill pump and the recirculation pump based on information from the first and second temperature sensors to maintain the temperature of the water in the tank within a predetermined temperature range. A method for maintaining livewell water temperature is also provided.

18 Claims, 6 Drawing Sheets

(56) References Cited

U.S. PATENT DOCUMENTS

| | | | |
|---|---|---|---|
| 7,156,617 | B2 | 1/2007 | Rossman |
| 10,329,165 | B2 | 6/2019 | Penrose et al. |
| 10,508,647 | B2 | 12/2019 | Stobbe |
| 10,990,622 | B2 | 4/2021 | Laster et al. |
| 2003/0033746 | A1 | 2/2003 | Johnson et al. |
| 2005/0183431 | A1 | 8/2005 | Rabal |
| 2006/0067052 | A1 | 3/2006 | Tapitan et al. |
| 2008/0028667 | A1 | 2/2008 | Grzybowski |
| 2017/0215401 | A1 | 8/2017 | Ellis, II |
| 2018/0153144 | A1 | 6/2018 | Baker |
| 2018/0365246 | A1 | 12/2018 | Laster et al. |

OTHER PUBLICATIONS

Industrial Water Chiller, 1 Ton J Series Chiller, brochure, admitted prior art.

Pentair, Coolworks Ice Probe, website, admitted prior art, available at https://pentairaes.com/coolworks-ice-probe-reg.html, last accessed Oct. 26, 2021.

Pentair, Temperature Controllers, admitted prior art, available at https://pentairaes.com/temperature-controllers.html, last accessed Oct. 26, 2021.

McCloskey et al., "Effect of water temperature and dissolved oxygen concentration on the photo-induced toxicity of anthracene to juvenile bluegill sun fish (*Lepomis macrochirus*)," paper in Aquatic Toxicology, vol. 21, Iss. 3-4, Dec. 1991, pp. 145-156.

McArley et al., "Hyperoxia increases maximum oxygen consumption and aerobic scope of intertidal fish facing acutely high temperatures," article in Journal of Experimental Biology, 2018, pp. 1-9.

Beamish, F.W.H., "Swimming performance and metabolic rate of three tropical fishes in relation to temperature," article in Hydrobiologia, vol. 83, Sep. 1981, pp. 245-254.

Peoples et al., "Livewell System", U.S. Appl. No. 17/666,756, filed Feb. 8, 2022 (drawings and specification, including the claims, only).

Kollmann et al., "Smart Livewell System", U.S. Appl. No. 17/666,884, filed Feb. 8, 2022 (drawings and specification, including the claims, only).

Kollmann et al., "Oxygenation Of Water in a Livewell System", U.S. Appl. No. 17/667,120, filed Feb. 8, 2022 (drawings and specification, including the claims, only).

\* cited by examiner

LIVEWELL SYSTEM AND METHOD

FIELD

The present disclosure relates to systems for maintaining aquatic life in a tank.

BACKGROUND

U.S. Pat. No. 4,748,765 discloses an improved livewell apparatus and method of operation thereof for use in recreational fishing boats and like watercraft wherein water from the livewell is withdrawn, conveyed through a heat exchange conduit in an auxiliary ice chest or other heat exchange arrangement, and returned to the livewell tank through an aeration spray head. The water in the livewell tank is cooled in this manner to a temperature sufficiently reduced from the natural aquatic habitat of captured gamefish to induce a state of slowed metabolism of the gamefish and, in turn, to prolong their captive life in comparison with conventional livewells.

U.S. Pat. No. 6,044,901 discloses a temperature management apparatus provided for cooling a fluid located in an interior region of a live well, the fluid being circulated by a pump. The apparatus includes a heat exchanger including a front surface, a rear surface, a first side surface, a second side surface, an inlet configured to receive fluid from the live well, and an outlet configured to return fluid to the live well. The apparatus also includes a shroud having a front wall formed to include an aperture and first and second side walls configured to be coupled to first and second sides of the heat exchanger, respectively. The apparatus further includes a fan coupled to the front wall of the shroud in communication with the aperture to increase air flow over the heat exchanger.

U.S. Pat. No. 6,962,019 discloses an enhanced filtration and water conditioning system for a novel bait tank suitable for use in recreational boats, dockside and land based personal and commercial applications wherein water from the tank may be climactically controlled, filtered, purged of sediment, displaced scales and other fish waste and returned to the live well tank. Separate first and second water compartments within the tank function in concert with a second interior wall and a second interior bottom, a dual compartment filtration unit removably accommodated within the interior portion of the second compartment, and filtration unit inflow and outflow water conduits with each of the conduits communicably attaching the filtration unit to the first and said second interior water compartments. An independent circulatory means allows for water to be additionally withdrawn from the tank and introduced to a refrigerant based heat exchanger means, regulated in a manner to sustain a water temperature necessary to sustain the life of fish placed within the tank and then re-introduced into the tank.

U.S. Pat. No. 7,024,814 discloses a novel system, apparatus and method of operation for use in watercraft, terrestrially bound motor vehicles and fixed based land applications where water from a live well or bait tank is withdrawn, filtered, climactically controlled and conveyed through a water conditioning unit containing in part a heat exchanging unit with a generally serpented contour water passageway, the water passageway formed and structured in a manner to allow water, or another fluid within the passageway to abut and surround a generally serpentine form tubular conduit containing a pressurized refrigerant with the water routed within the passageway maintaining continuous contact with the conduit then exiting the heat exchanging unit returned to the live well tank or bait tank.

U.S. Pat. No. 7,134,293 discloses an apparatus for cooling a live well including a cooling chamber, and a pump connected in fluid communication between the cooling chamber and the live well for circulating water between the live well and the cooling chamber. At least one thermoelectric cooler is positioned in a heat exchange relationship with the cooling chamber for removing heat from the cooling chamber and from water circulating in the cooling chamber.

U.S. Patent Application Publication No. 2017/0215401 discloses a live well oxygen and temperature level alert and control apparatus including a temperature sensor and oxygen sensor con figured to sense the temperature and oxygen level of a live well. The sensed signal is seat to a controlling and monitoring apparatus. The controlling and monitoring apparatus is linked to a heating or cooling control system of the live well. Further, the alert apparatus may be configured to control the supply of the fresh or salt replacement water to the live well by controlling a valve supplying such water. The controlling and monitoring apparatus is configured to alert a user about the oxygen and temperature level of the water inside the live-well and control these levels via a user interface. The further inventive aspects can be embodied in one or more of a display screen, a speaker, and an alarm for communicating oxygen and temperature level to a user.

U.S. Patent Application Publication No. 2018/0153144 discloses a system for maintaining the health of captive fish in a mobile environment, comprising a live well for containing fish in a fluid medium, a plurality of thermoelectric coolers affixed to the live well, and a live well controller for controlling a direct current applied to the thermoelectric coolers, and a method for maintaining a consistent temperature comprising the steps of setting an initial temperature, applying a current to thermoelectric coolers, reading a new temperature, and adjusting the current based at least in part on the new temperature reading.

U.S. Pat. No. 10,329,165 discloses a mobile treatment system having a mobile or wheelable container able to receive a secondary volume of water separate from the primary volume of water of the aquarium; a pump mountable to a portion of the mobile container, a first Inlet of the pump able to draw water from a portion of the mobile container, a first outlet of the pump connectable for selectively directing water drawn into the first Inlet back into the mobile container after conditioning of the water, a second inlet able to draw conditioned water from a portion of the mobile container having the conditioned water; a second outlet allowing transfer of the conditioned water from the mobile container to the aquarium, wherein the water is conditioned in the secondary volume of the mobile container at a position remote to the aquarium.

U.S. Pat. No. 10,990,622, which is hereby incorporated by reference herein in its entirety, discloses livewells of a vessel that are used to store caught fish, such as during fishing competitions. Example apparatuses, systems, and methods are provided herein that may track and use fishing information for efficient operation and control of livewells and the associated pumps. An example marine electronic device of a vessel comprises a user interface with a display screen, a processor, and memory including computer program code. The memory and the computer program code are configured to, with the processor, cause the marine electronic device to receive an indication of a fish catch and cause, in response to receiving the indication of the fish catch, a pump associated with a livewell of the vessel to one of fill the livewell with water or recirculate water in the livewell, wherein the water is pumped from a body of water in which the vessel is at least partially submerged.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a livewell system includes a tank configured to hold water, a fill pump configured to pump water into the tank from a body of water external to the tank, and a recirculation pump configured to pump water out of the tank and subsequently back into the tank. A first temperature sensor is configured to sense a temperature of the water in the body of water, and a second temperature sensor is configured to sense a temperature of the water in the tank. A controller is provided in signal communication with the fill pump, the recirculation pump, and the first and second temperature sensors. The controller is configured to operate the fill pump and the recirculation pump based on information from the first and second temperature sensors so as to maintain the temperature of the water in the tank within a predetermined temperature range.

In one example, the first temperature sensor is located in the fill pump, such as for example in a suction inlet of the fill pump.

In one example, the second temperature sensor is located in the recirculation pump. The controller may be configured to run the recirculation pump for a predetermined period of time before using the information from the second temperature sensor to operate the fill pump and the recirculation pump so as to maintain the temperature of the water in the tank within the predetermined temperature range.

In one example, a conduit is provided downstream of the recirculation pump, and the recirculation pump is configured to pump water out of the tank, through the conduit, and back into the tank. A heat exchanger is provided in fluid communication with the conduit, and the heat exchanger is configured to cool the water in the conduit. The controller is configured to selectively divert water in the conduit to the heat exchanger so as to cool the water in the conduit before it is returned to the tank.

In one example, in response to determining that (a) the temperature of the water in the tank is above the predetermined temperature range and (b) the water in the body of water is warmer than the water in the tank, the controller is configured to activate the recirculation pump to pump water out of the tank, through the conduit, through the heat exchanger, and subsequently back into the tank.

In one example, in response to determining that the temperature of the water in the tank is within the predetermined temperature range, the controller is configured to activate the recirculation pump to pump water out of the tank, through the conduit, and subsequently back into the tank, bypassing the heat exchanger.

In one example, in response to determining that (a) the temperature of the water in the tank is above the predetermined temperature range and (b) the water in the body of water is cooler than the water in the tank, the controller is configured to activate the fill pump to pump water into the tank from the body of water.

In one example, in response to determining that (a) the temperature of the water in the tank is below the predetermined temperature range and (b) the water in the body of water is warmer than the water in the tank, the controller is configured to activate the fill pump to pump water into the tank from the body of water.

A method for a livewell system, the livewell system including a tank and at least one pump configured to pump water into and/or out of the tank, is provided according to another example of the present disclosure. The method includes determining a temperature of water in the tank and determining a temperature of water in a body of water external to the tank. A controller compares the temperature of the water in the tank to the temperature of the water in the body of water. The controller automatically operates the at least one pump based on the comparison so as to maintain the temperature of the water in the tank within a predetermined temperature range.

In one example, the method includes operating the at least one pump, with the controller, to fill the tank with water from the body of water in response to determining that (a) the temperature of the water in the tank is above the predetermined temperature range and (b) the water in the body of water is cooler than the water in the tank.

In one example, the method includes operating the at least one pump, with the controller, to fill the tank with water from the body of water in response to determining that (a) the temperature of the water in the tank is below the predetermined temperature range and (b) the water in the body of water is warmer than the water in the tank.

In one example, the method includes operating the at least one pump, with the controller, to pump water out of the tank, through a heat exchanger configured to cool the water, and subsequently back into the tank in response to determining that (a) the temperature of the water in the tank is above the predetermined temperature range and (b) the water in the body of water is warmer than the water in the tank.

BRIEF DESCRIPTION OF THE DRAWINGS

Examples of livewell systems and methods therefor are described with reference to the following Figures. The same numbers are used throughout the Figures to reference like features and like components.

DETAILED DESCRIPTION

Figure 1:
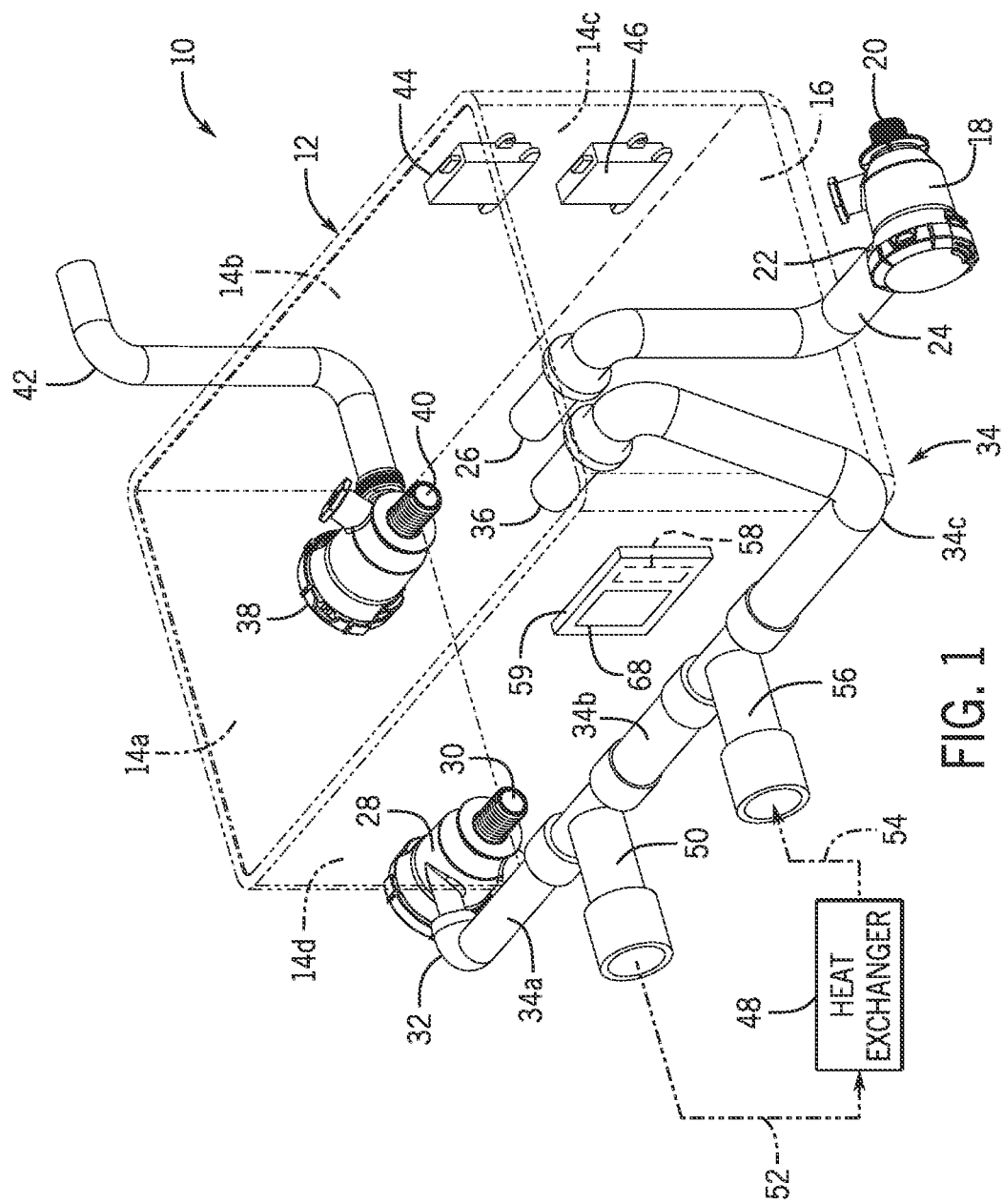
FIG. 1 illustrates an example of a livewell system according to the present disclosure.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

As used here, the term "livewell" is broader than its typical use, and encompasses any holding tanks, livewells, baitwells, or fish tanks, whether boat-mounted or not, configured to contain water for supporting aquatic life. For example, livewells are used to hold fish or other aquatic animals that are intended to be transferred back to the water from which they were caught or into another tank.

Referring to FIG. 1, according to one example of the present disclosure, a livewell system 10 includes a tank 12 configured to hold water. In one example, the livewell system 10 is configured to be installed on a marine vessel, although it could instead be installed on land or it could be portable. The tank 12 has four sidewalls 14a-d and a bottom wall 16. A lid (not shown) may be provided to cover the tank 12. The livewell system 10 also includes a fill pump 18 configured to pump water into the tank 12 from a body of water (e.g., a lake, river, etc.) external to the tank 12, such as water in which the marine vessel is operating. The fill pump 18 has a suction inlet 20, which may include a strainer net, or other type of mesh, through which water in the body of water is drawn into the fill pump 18. The fill pump 18 also has an outlet 22 through which water is pumped into the tank 12 via a conduit 24. The water may enter the tank 12 through a fill inlet 26, which may be an aerator spray head.

The livewell system 10 also includes a recirculation pump 28 configured to pump water out of the tank 12 and subsequently back into the tank 12. The recirculation pump 28 has a suction inlet 30 configured to draw water into the recirculation pump 28 from the tank 12. The suction inlet 30 may also be provided with a strainer or the like to prevent fish or debris in the tank 12 from being sucked into the recirculation pump 28. The recirculation pump 28 also has an outlet 32, which connects back to the tank 12 via a conduit 34 (including conduits 34a-c). The recirculated water may re-enter the tank 12 through a fill inlet 36, which may also be an aerator spray head.

The livewell system 10 also includes a drain pump 38 configured to pump water out of the tank 12 and into the body of water or into a bilge of the marine vessel, after which it may be pumped into the body of water by a bilge pump. The drain pump 38 has a suction inlet 40, which may be fitted with a strainer or the like for the same purposes noted hereinabove. The drain pump 38 also includes an outlet (not shown), which connects to a conduit 42 leading overboard or to the bilge.

By way of internal or external diverter valves, any two or all three of the pumps 18, 28, 38 could be used to perform more than one function. For example, a single pump could be used to pump fresh water into the tank 12 or to recirculate water out of and back into the tank 12. A single pump could be used to drain water out of the tank 12 or to recirculate water out of and back into the tank 12. A single pump could be used to pump fresh water into the tank 12, recirculate water out of and back into the tank 12, or to drain the tank 12. The internal or external diverter valves would be controlled by the controller 58, noted herein below, to provide water from the desired source to the desired outlet.

The livewell system 10 also may include water level sensors, such as upper water level sensor 44 and lower water level sensor 46. The water level sensors 44, 46 may be used to control filling of the tank 12 with water. For example, when neither the upper water level sensor 44 nor the lower water level sensor 46 senses water, the fill pump 18 may be activated to fill the tank 12. The fill pump 18 may then be turned off when both the upper water level sensor 44 and the lower water level sensor 46 sense water, in order to avoid overfilling the tank. As is known, an overfill outlet (not shown) may also be provided in the tank 12 as a way to control any overflow that might occur due to overfilling the tank 12 with water and/or due to the addition of fish into the tank 12.

The livewell system 10 may also include a heat exchanger 48 (shown schematically), the purpose and control of which will be described further herein below. The heat exchanger 48 is provided in fluid communication with the recirculation pump 28 via conduit 34a, a tee fitting 50, and an optional additional conduit 52. The tee fitting 50 or the conduits 34b, 52 include an electrically actuated valve or valves that can divert water to the heat exchanger 48 or direct water through the conduit 34b. If water is diverted through the heat exchanger 48, it then flows through an optional conduit 54, through tee fitting 56, and then through conduit 34c back into the tank 12. The tee fitting 56 or conduits 34b, 54 also include an electrically actuated valve or valves that control whether water flows through or bypasses the heat exchanger 48. Those having ordinary skill in the art would understand that various types of valves could be provided to direct water from the conduit 34a, through the tee fitting 50, through the conduit 34b, through the tee fitting 56, and through the conduit 34c, bypassing the conduits 52 and 54 and thus the heat exchanger 48. The same valves could be actuated to different positions that would provide water from the conduit 34a, through the tee fitting 50, to the conduit 52, through the heat exchanger 48, through the conduit 54, through the tee fitting 56, then through the conduit 34c, while closing off the conduit 34b to the flow of water. For example, each tee fitting 50, 56 can be provided with an electrically actuated three-way diverting valve.

Figure 2:
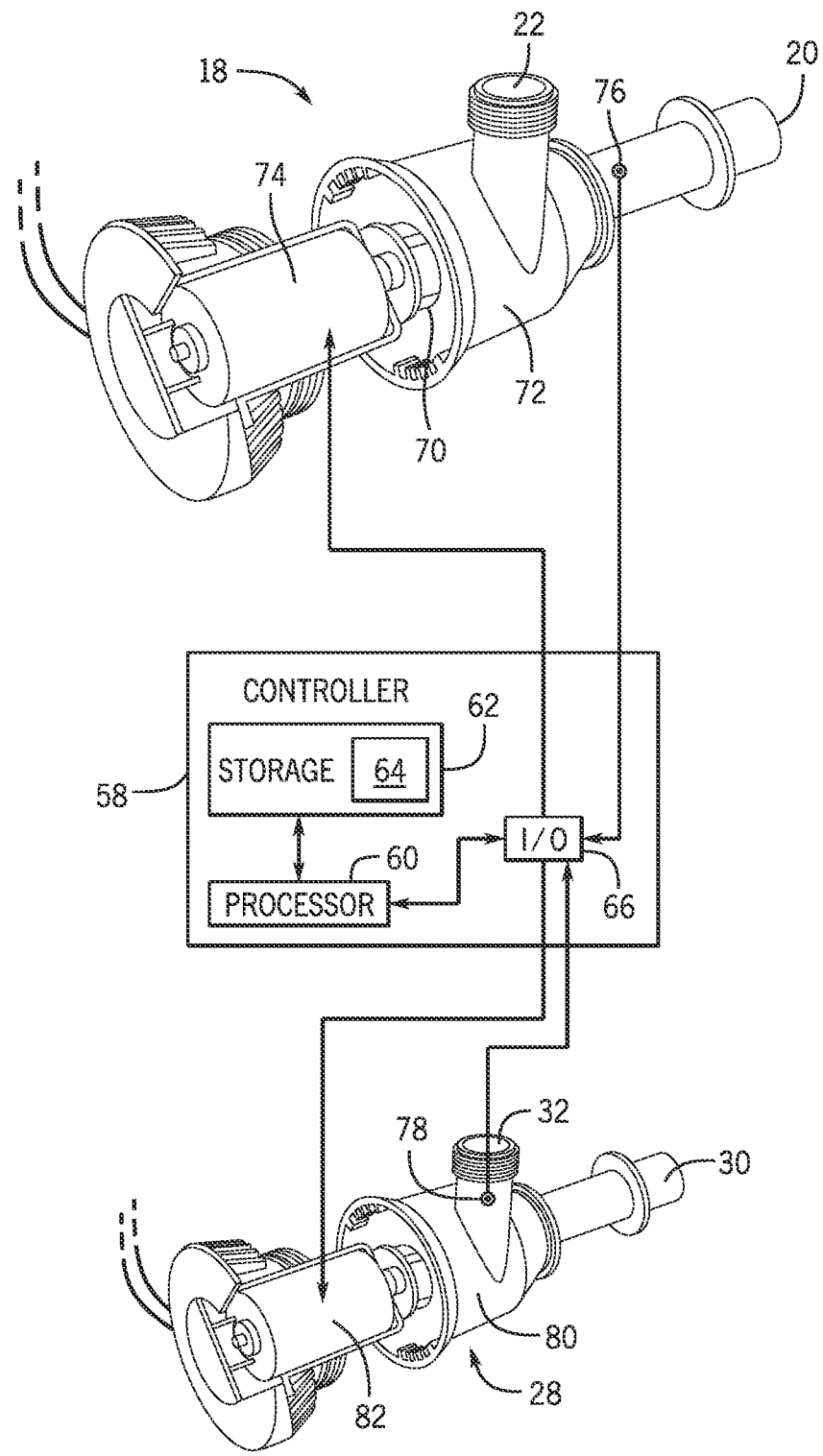
FIG. 2 illustrates a controller that controls pumps in the livewell system.

A controller 58 is provided in signal communication with the fill pump 18, the recirculation pump 28, the drain pump 38, the upper and lower water level sensors 44, 46, and any valves directing flow to or away from the heat exchanger 48. The controller 58 is located on or within a housing 59, for example, as a component on an integrated circuit within the housing 59. Although the controller housing 59 is shown as being provided on the wall 14d of the tank 12, the controller 58 could be provided elsewhere, such as for example as part of one or more of the pumps 18, 28, 38. In one example, the controller 58 is wired to the various components of the livewell system 10, such as by way of direct wiring or by way of a serial bus. In another example, the controller 58 may be remote from the tank 12 and is equipped with a wireless transceiver, and the various components with which the controller 58 communicates are each provided with wireless capabilities for communicating with the controller 58. Exemplary wireless protocols that could be used for this purpose include, but are not limited to, Bluetooth©, Bluetooth Low Energy (BLE), ANT, and ZigBee. Referring to FIG. 2, the controller 58 includes a processing system 60 and a storage system 62 accessible by the processing system 60. The controller 58 includes a temperature control module 64, which is a set of software instructions executable to monitor the temperature of the water in the tank 12, determine if action needs to be taken to change the temperature, and execute a routine to bring the temperature back within a predetermined temperature range, as described herein below. The controller 58 also includes an input/output (I/O) interface 66, which relays information to and from the processing system 60. For example, the I/O interface 66 may be electrically connected to a control panel 68 on the housing 59, as shown in FIG. 1, via which a user can input information to the controller 58. Note that the controller 58 is not shown as being connected to every component in the diagrams provided herein, but the controller 58 is in fact directly or indirectly electrically and/or signally connected to each component that it is described as controlling or from which it receives information.

The I/O interface 66 also provides two-way communication between the controller 58 and one or more of the pumps 18, 28, 38, although only the fill pump 18 and the recirculation pump 28 are shown in FIG. 2. Both pumps 18, 28 are shown as being centrifugal pumps, but another type of pump could be used, such as a displacement pump. In other examples, the pumps 18, 28, 38 are different types than one another. Referring specifically to the fill pump 18, the pump includes the above-noted suction inlet 20. Water is drawn into the fill pump 18 via the suction inlet 20 by an impeller 70 located in a casing 72. The impeller 70 is powered by an electric motor 74. The impeller 70 and casing 72 are configured such that water is pumped out under pressure via the outlet 22. More details of one non-limiting example of such a pump may be found in U.S. Pat. No. 7,156,617, which is hereby incorporated by reference herein in its entirety. Commercially available non-limiting examples of a pump of this type are the Tsunami Aerator Pumps T500, T800, or T1200, available from Attwood Corporation of Lowell, Michigan. One difference between the pump of the '617 patent or the noted commercially available pumps and the fill pump 18 shown herein is that the fill pump 18 includes a temperature sensor 76. In this example, the temperature sensor 76 is shown in the suction inlet 20 of the fill pump 18, but in another example, the temperature sensor is located in the casing 72 or in the outlet 22 of the fill pump 18. The temperature sensor 76 measures the temperature of the water inside the pump 18, and in this way, serves as a first temperature sensor configured to sense a temperature of the water in the body of water in which the marine vessel is operating. In other examples, the temperature sensor may be located on an outside of the fill pump 18, such as on the outside of the suction inlet 20, for instance in an arrangement in which the suction inlet 20 is located directly within the body of water in which the marine vessel is operating. (This may be the case when the fill function is performed by a multi-function fill and recirculation pump, if the suction inlet that draws fresh water into the pump is located remote from the pump casing.) Locating the temperature sensor 76 in, at, or near the suction inlet 20 may provide a more accurate reading of water temperature in the body of water than a temperature sensor in the casing 72 or outlet 22 might otherwise give, as the motor 74 may heat the water slightly.

A second temperature sensor is configured to sense a temperature of the water in the tank 12. As shown in FIG. 2, the second temperature sensor 78 is located in the recirculation pump 28, such as in the outlet 32 thereof. As with the first temperature sensor 76, the second temperature sensor 78 could instead be located in the suction inlet 30 or the casing 80.

The first and second temperature sensor 76, 78 may be any type of known water temperature sensor, such as a thermistor, a thermocouple, or an infrared sensor. The bodies of the temperature sensors 76, 78 are sealed in a watertight manner to the component of the pump 18, 28 through which the sensor body extends, while the probe ends are configured to be in contact with the water in the respective pump. In some examples, the temperature sensors 76, 78 are in direct wired or wireless communication with the controller 58. In other examples, the temperature sensors 76, 78 are internally wired to a control board within the pump 18, 28, and temperature information is provided to the controller 58 through the pump's connection to the controller 58.

As shown, the controller 58 is provided in signal communication with the fill pump 18, the recirculation pump 28, and the first and second temperature sensors 76, 78. According to instructions stored in the temperature control module 64, the controller 58 is configured to operate the fill pump 18 and the recirculation pump 28 based on information from the first and second temperature sensors 76, 78 so as to maintain the temperature of the water in the tank 12 within a predetermined temperature range. In order to operate the pumps 18, 28, the controller 58 is in signal and/or electrical communication with the motor 74 of the fill pump 18 to turn the fill pump 18 on or off. The controller 58 is also in signal and/or electrical communication with the motor 82 of the recirculation pump 28 to turn the recirculation pump 28 on or off. For example, the controller 58 can be configured to connect or disconnect the motors 74, 82 to or from a power source (not shown), such as the main battery on the marine vessel or a dedicated battery for the livewell system 10.

The predetermined temperature range can be any temperature range suitable for maintaining aquatic life in the tank 12, and it should be understood that this temperature range could vary based on the conditions in which the user is fishing. In one example, the predetermined temperature range is close to the temperature of the water in the body of water in which the marine vessel is operating, which the controller 58 may determine and set as a setpoint based on information from the first temperature sensor 76. For example, the controller 58 may set the predetermined temperature range as a five degree deadband around the measured temperature of the water in the body of water (i.e., 2.5 degrees above the temperature of the body of water and 2.5 degrees below the temperature of the body of water). The deadband can be calibrated and/or settable by the user. In another example, the predetermined temperature range is a range set manually by the user, such as through buttons or other user inputs on the control panel 68 connected to the controller 58. In some examples, the temperature range is only 0.999 degrees, i.e., the temperature of the water in the tank 12 is intended to stay at one temperature value. In other examples, the temperature range is 1-5 degrees above or below a setpoint temperature, which range can be chosen by the user or automatically set by the controller 58. In other examples, the predetermined temperature range is one associated with a user selection of a type of fishing condition, such as fishing in a lake, pond, or river during a given season, ice fishing, etc. In still another example, the predetermined temperature range is set based on information provided wirelessly, such as a temperature of the water at a depth the user is fishing, as determined by a remote temperature sensor.

Thus, it can be seen that the first temperature sensor need not be provided on or in the fill pump 18. For example, the first temperature sensor could be provided remotely, at a depth the user is fishing, such as on a sinker the user drops into the body of water, or on a piece of wireless equipment that provides information to the cloud for access by multiple users. The first temperature sensor could be provided on a trolling motor on the marine vessel or on the hull of the marine vessel. However, having the first temperature sensor 76 in the fill pump 18 may provide advantages in terms of cost, ease of installation, and/or trouble-shooting.

So, too, the second temperature sensor need not be provided in the recirculation pump 28. For instance, the second temperature sensor could be provided elsewhere in the tank 12, or in the drain pump 38. However, certain advantages may be realized by providing the second temperature sensor 78 in the recirculation pump 28. For instance, because a temperature sensor in the tank 12 measures a temperature of the water at that particular location and depth, while temperature in the tank 12 may vary based on location and/or depth, it may be desirable to instead measure the temperature of the water after it has been mixed, thereby providing a more accurate reading of average tank temperature. For example, the controller 58 may be configured to run the recirculation pump 28 for a predetermined period of time before using the information from the second temperature sensor 78, through which the mixed water runs, to operate the fill pump 18 and the recirculation pump 28 so as to maintain the temperature of the water in the tank 12 within the predetermined temperature range. In some examples, the controller 58 is configured to run the recirculation pump 28 periodically to sample the temperature of the water in the tank 12.

The controller 58 is configured, per the instruction in the temperature control module 64, to determine how to run the pumps 18, 28, and/or 38 to maintain the temperature of the water in the tank 12 within the predetermined temperature range. In contrast to prior art systems, which simply assume that filling the tank 12 with fresh water will lower the temperature of the water in the tank 12, or which are configured to provide cooling only via a heat exchanger, the controller 58 is configured to determine which pump(s) to run and whether to cool the water using the heat exchanger 48 based on a comparison between the temperature of the water in the tank 12 and the temperature of the water in the body of water. This may allow for more efficient (and thus less expensive) temperature control of the livewell system 10.

In one example, in response to determining that (a) the temperature of the water in the tank 12 is above the predetermined temperature range and (b) the water in the body of water is cooler than the water in the tank 12, the controller 58 is configured to activate the fill pump 18 to pump water into the tank 12 from the body of water. Thus, the controller 58 uses the naturally cooler water in the body of water to lower the temperature of the water within the tank 12.

Conversely, in another example, in response to determining that (a) the temperature of the water in the tank 12 is below the predetermined temperature range and (b) the water in the body of water is warmer than the water in the tank 12, the controller 58 is configured to activate the fill pump 18 to pump water into the tank 12 from the body of water. This might be the case if a user is ice fishing, or if the heat exchanger 48 (described below) has overcooled the water.

In one example, the controller 58 is configured to activate the drain pump 38 to pump water out of the tank 12 while activating the fill pump 18 to pump water into the tank 12 from the body of water. For example, the controller 58 can be programmed with the volume of the tank such that the tank 12 may be filled at the same rate it is emptied, so as to reduce stress on the fish in the tank 12. This may work to exchange the water more quickly. Note that the drain pump 38 could in some instances be one and the same as the recirculation pump 28, such as if internal or external valving is provided to divert water flow back to the tank 12 or overboard/to the bilge. In other instances, the excess water in the tank 12 simply leaves via the overflow outlet rather than being actively pumped from the tank 12.

In some instances, the temperature of the water in the body of water will not be lower than that in the tank 12 (e.g., the body of water will be warmer than or the same temperature as the water in the tank 12) or will not be low enough (i.e., different enough from the temperature of the water in the tank 12) to efficiently cool the water in the tank 12. In such cases, the controller 58 is configured to cool the water in the tank 12 using the heat exchanger 48. In one such example, in response to determining that (a) the temperature of the water in the tank 12 is above the predetermined temperature range and (b) the water in the body of water is warmer than the water in the tank 12, the controller 58 is configured to activate the recirculation pump 28 to pump water out of the tank 12, through the conduit 34, through the heat exchanger 48, and subsequently back into the tank 12.

As noted hereinabove, the conduit 34 is provided downstream of the recirculation pump 28. The recirculation pump 28 is configured to pump water out of the tank 12, through the conduit 34, and back into the tank 12. The heat exchanger 48 is provided in fluid communication with the conduit 34 (via conduit 34a, tee fitting 50, and optional conduit 52), and the heat exchanger 48 is configured to cool the water in the conduit 34. When such cooling is required, the controller 58 is configured to selectively divert water in the conduit 34 to the heat exchanger 48 so as to cool the water in the conduit 34 before it is returned to the tank 12. This can be done by way of the controller 58 actuating valves in the conduit 34 and/or tee fittings 50, 56, as noted herein above.

Figure 3:
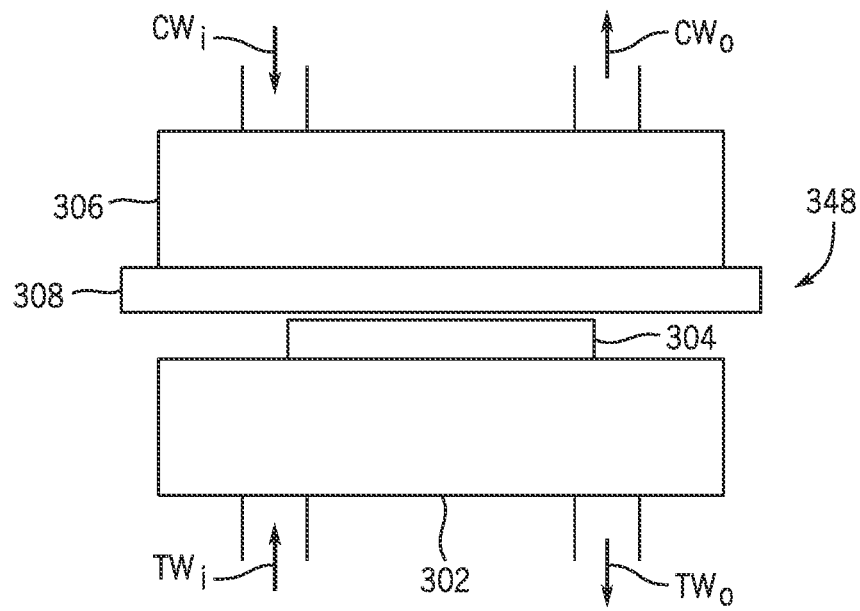
FIG. 3 illustrates one example of a thermoelectric cooler for cooling water in the tank of the livewell system.
Figure 4:
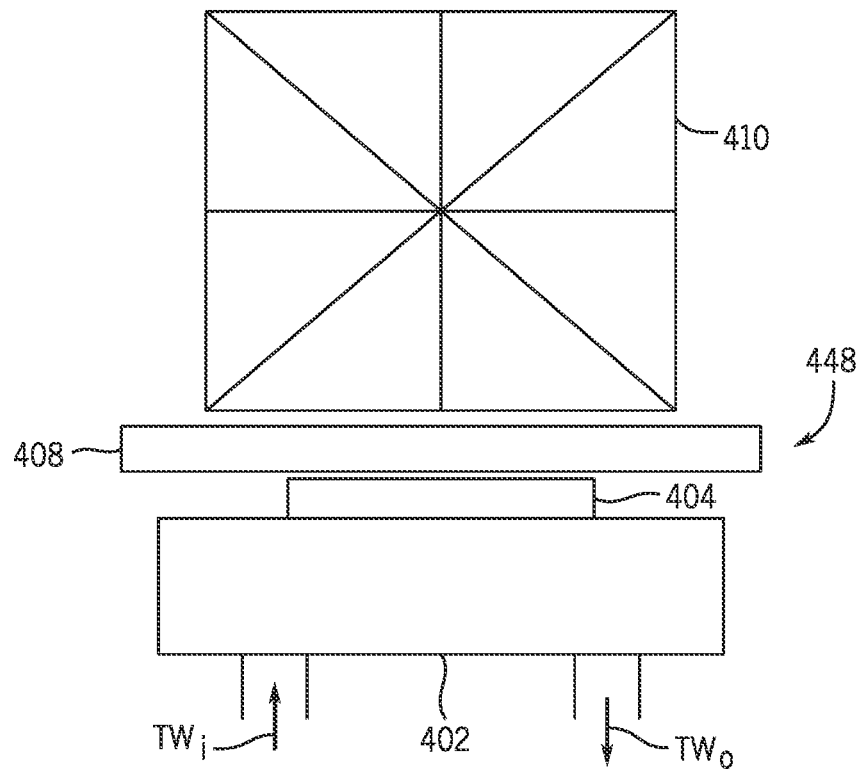
FIG. 4 illustrates another example of a thermoelectric cooler.

FIGS. 3-6 illustrate exemplary heat exchangers that can be used in the livewell system 10. In the examples of FIGS. 3 and 4, the heat exchanger 48 comprises a thermoelectric cooler. In FIG. 3, water from the recirculation pump 28 enters the heat exchanger 348 from the tee fitting 50 as shown at arrow TWi. This water enters a plenum or conduit 302, which is in thermal contact with an aluminum plate 304. Meanwhile, cooling water enters another plenum or conduit 306 as shown by the arrow CWi. The cooling water can be provided from a cool water source, such as the body of water in which the marine vessel is operating, an ice chest, or a refrigeration unit. The plenum or conduit 306 is in thermal contact with another aluminum plate 308. The tank water is cooled as heat is transferred from the aluminum plate 304 to the aluminum plate 308. Warmed water exits the plenum 306 as shown by the arrow CWo, while cooled water exits the plenum 302 as shown by the arrow TWo. The cooled water returns to the tank 12 by way of the tee fitting 56 and the conduit 34c. In FIG. 4, the heat exchanger 448 operates similar to the heat exchanger 348 of FIG. 3, only a motor-powered fan 410 is used to cool the aluminum plate 408 instead of cooling water. The other components of the heat exchanger 448 are the same as those of the heat exchanger 348 bearing the same second two digits, and will not be described further herein.

Figure 5:
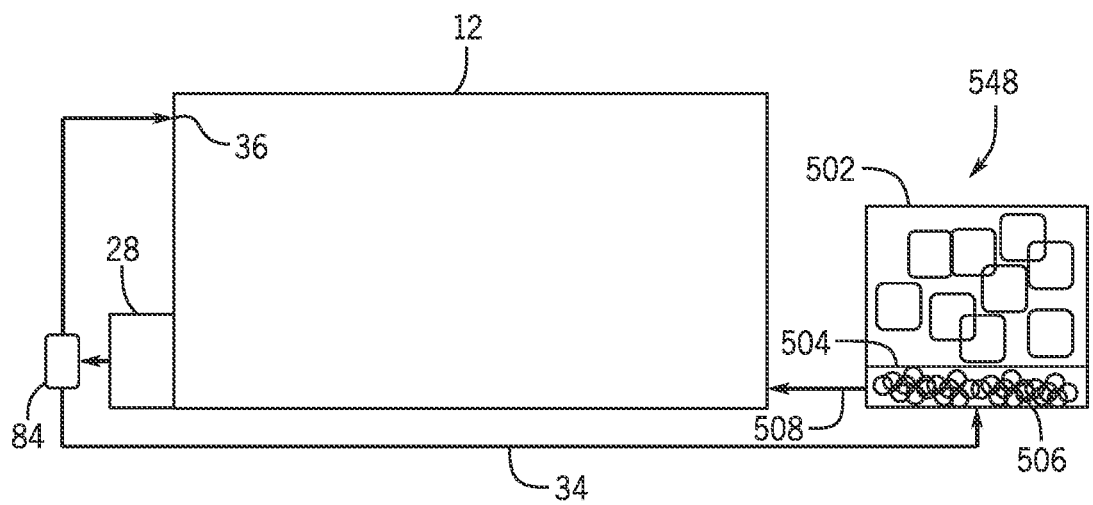
FIG. 5 illustrates an ice chest for cooling water in the tank of the livewell system.

FIG. 5 illustrates an example in which a heat exchanger 548 comprising an ice chest 502 is used to cool the water in the tank 12. Water is pumped from the tank 12 by the recirculation pump 28, and a diverter valve 84 directs the water to the ice chest 502 via conduit 34. A grate 504 is located at the bottom of the ice chest 502, which prevents the ice from contacting copper cooling lines 506. The grate 504 also allows for the cooled water to move to the bottom of the ice chest 502. The tank water can either run through the cooper cooling lines 506 and then back into the tank 12, or the tank water can run directly through the ice chest 502, in which case the copper cooling lines 506 may be filled with a cooled refrigerant. Cooled water is then returned to the tank 12 as shown by the arrow 508. The cooled water is returned to the tank 12 through a conduit with a screen or the like at the end, or through an aerator spray head.

Figure 6:
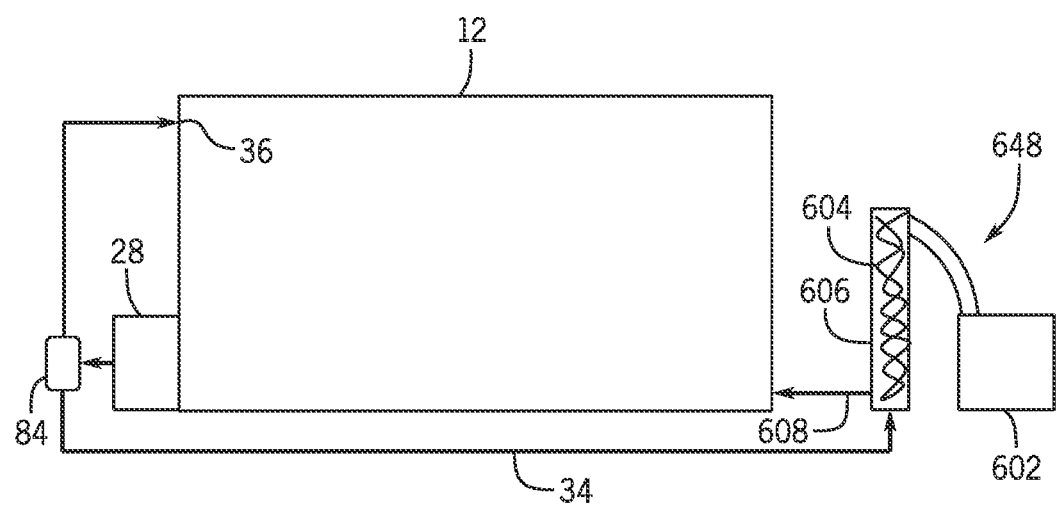
FIG. 6 illustrates a condenser for cooling water in the tank of the livewell system.

In FIG. 6, water is pumped from the tank 12 by the recirculation pump 28, and a diverter valve 84 directs the water to a plenum or tank 606 via conduit 34. The heat exchanger 648 comprises a condenser 602 that provides cooled refrigerant to copper lines 604 located in the plenum or tank 606. The heat in the water from the tank 12 is transferred to the refrigerant, which refrigerant is returned to the condenser 602 to be cooled and used again. Cooled water is returned to the tank 12 as shown at 608. In another example, the copper lines containing cooled refrigerant are located at the bottom of the livewell tank 12.

Note that the diverter valve 84 in both the examples of FIGS. 5 and 6 can instead direct water from the recirculation pump 28 directly back to the tank 12, bypassing the heat exchanger 548, 648. This is true also of any valving provided in the conduit 34 and/or tee fittings 50, 56 and applies also to the embodiments of FIGS. 3 and 4. Being able to bypass the heat exchanger 48, 348, 448, 548, 648 might be useful when the temperature of the water is acceptable, but aeration is still required to maintain desired dissolved oxygen levels. For example, in response to determining that the temperature of the water in the tank 12 is within the predetermined temperature range, the controller 58 is configured to activate the recirculation pump 28 to pump water out of the tank 12, through the conduit 34, and subsequently back into the tank 12, bypassing the heat exchanger 48, 348, 448, 548, 648. In other words, the controller 58 can still operate the fill pump 18 and/or the recirculation pump 28 for reasons unrelated to water temperature, such as to maintain a desired dissolved oxygen content, to filter the water to remove ammonia, or on a regular schedule.

Note that the controller 58 may be configured to activate the fill pump 18 only if the temperature of the water in the body of water differs from the temperature of the water in tank 12 by more than a given amount, for example, three degrees. If, for example, the temperature in the body of water is only half a degree less than that of the water in the tank 12 (and assuming this temperature difference is enough that the temperature of the water in the tank 12 is outside the predetermined range, while the temperature of the water in the body of water is inside the predetermined range), the fill pump 18 may still not be used to exchange the water, as there is likely a more efficient way to cool the water than exchanging nearly all the water in the tank 12 with fresh water. In this instance, although the water in the body of water is cooler and could technically be used to reduce the temperature of the water in the tank 12, the controller 58 may instead be configured to use the recirculation pump 28 and heat exchanger 48 to cool the water.

Typically, control over the temperature of the water in the tank 12 will be non-proportional. In other words, once the controller 58 determines that cooling or heating of the water in the tank 12 is required, the controller 58 will run the fill pump 18 or divert water through the heat exchanger 48 until the second temperature sensor 78 determines that the temperature of the water in the tank 12 is back within the predetermined range. Of course, hysteresis may be provided to prevent endless cycling on and off of the pumps 18, 28, 38. In other examples the controller 58 may be programmed to provide a proportional response to correct the temperature of the water in the tank 12. For instance, the controller 58 can be programmed to divert the water to the heat exchanger 48 or to run the fill pump 18 for a period of time dependent on the difference between the actual and setpoint temperature of the water in the tank 12.

Figure 7:
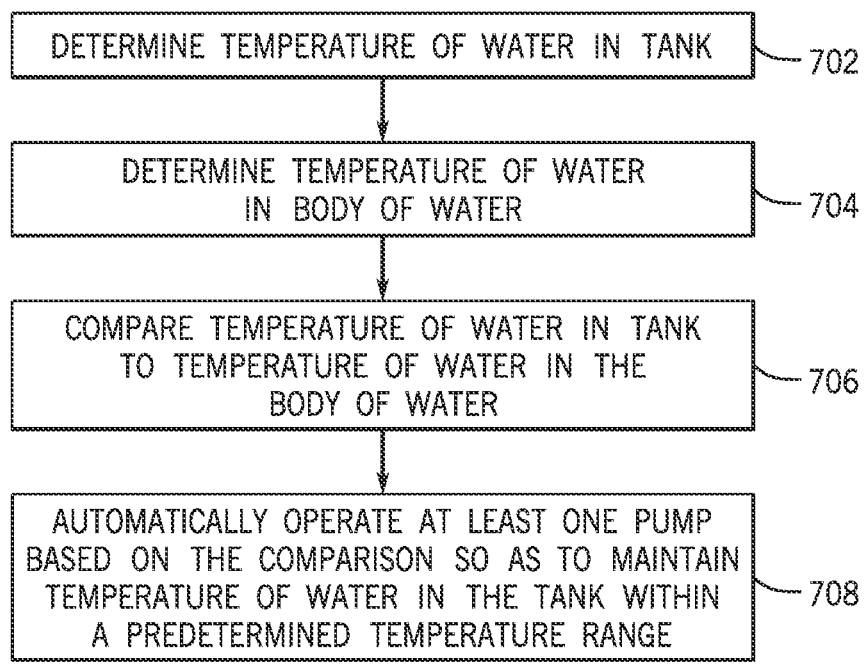
FIG. 7 illustrates a method for maintaining the temperature of water in a livewell tank according to the present disclosure.

FIG. 7 illustrates a method for a livewell system 10, the livewell system 10 including a tank 12 and at least one pump 18, 28, 38 configured to pump water into and/or out of the tank 12. The method includes determining a temperature of water in the tank 12, as shown at 702. This can be done using a first temperature sensor 78 located in the tank 12 or in the recirculation pump 28 or drain pump 38 as noted hereinabove. The method also includes determining a temperature of water in a body of water external to the tank 12, as shown at 704. This can be done using a second temperature sensor 76 located in the fill pump 18 or elsewhere as noted hereinabove. The method next includes, with a controller 58, comparing the temperature of the water in the tank 12 to the temperature of the water in the body of water, as shown at 706. As shown at 708, the method includes automatically operating the at least one pump 18, 28, 38 based on the comparison so as to maintain the temperature of the water in the tank 12 within a predetermined temperature range.

As detailed further hereinabove, in one example, the method includes operating the at least one pump 18, with the controller 58, to fill the tank 12 with water from the body of water in response to determining that (a) the temperature of the water in the tank 12 is above the predetermined temperature range and (b) the water in the body of water is cooler than the water in the tank 12.

As detailed further hereinabove, in one example, the method includes operating the at least one pump 18, with the controller 58, to fill the tank 12 with water from the body of water in response to determining that (a) the temperature of the water in the tank 12 is below the predetermined temperature range and (b) the water in the body of water is warmer than the water in the tank 12.

As detailed further hereinabove, in one example, the method includes operating the at least one pump 28, with the controller 58, to pump water out of the tank 12, through a heat exchanger 48, 348, 448, 548, 648 configured to cool the water, and subsequently back into the tank 12 in response to determining that (a) the temperature of the water in the tank 12 is above the predetermined temperature range and (b) the water in the body of water is warmer than the water in the tank 12.

Although the method is described with reference to the fill pump 18 and the recirculation pump 28, as noted above, diverter valves could be provided such that the controller 58 could control a single, dual-function fill and recirculation pump to carry out the method.

Figure 8:
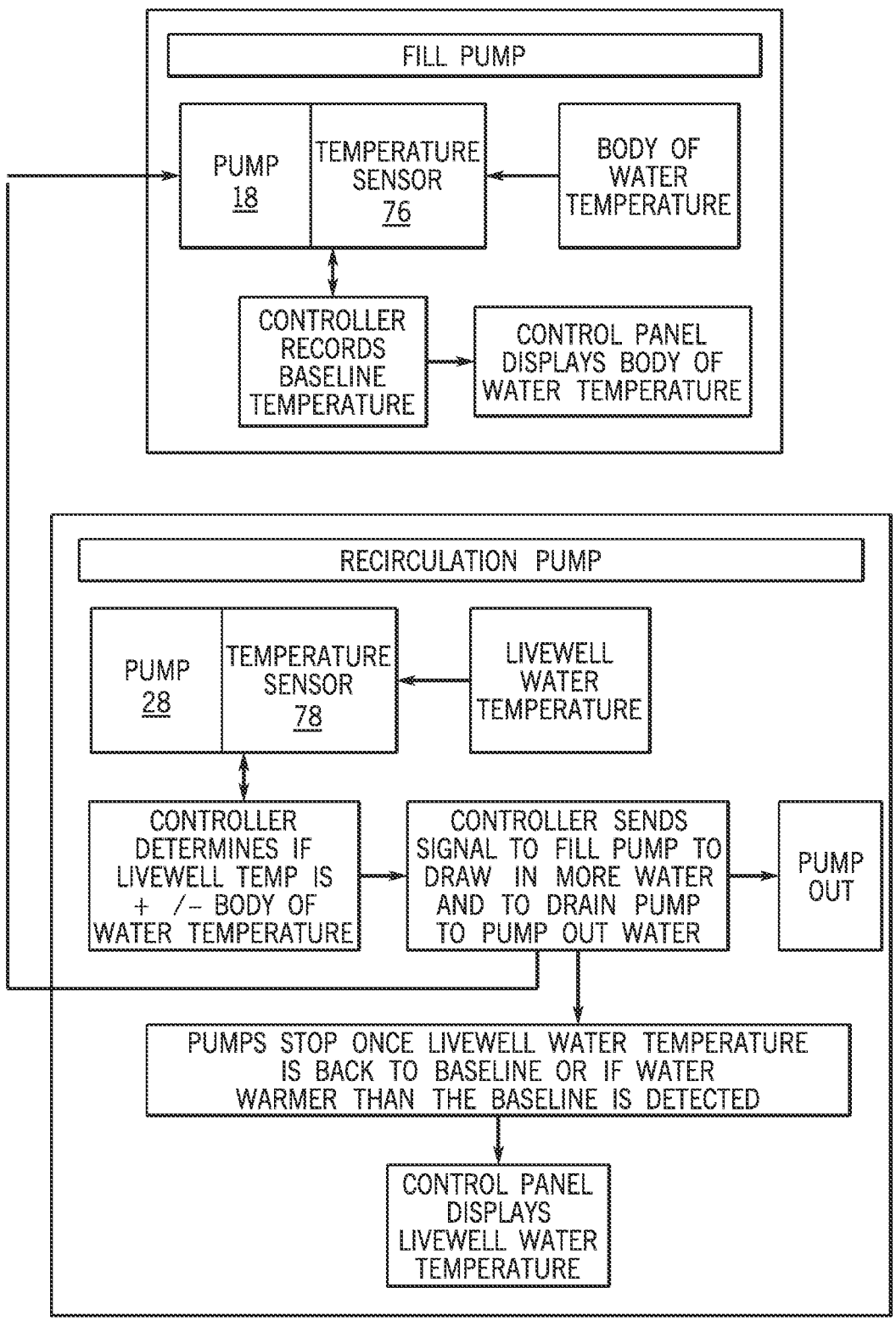
FIG. 8 illustrates one particular example of controlling the temperature of water in a livewell tank.

FIG. 8 illustrates one particular example of control over water temperature in the tank 12. As shown in the upper box, the temperature sensor 76 determines the temperature of the water in the body of water. The controller 58 records this temperature as the baseline/setpoint temperature. The control panel 68 displays the temperature of the water in the body of water to the user. Meanwhile, as shown in the lower box, the recirculation pump 28 may be running to aerate the water, or the temperature senor 78 therein may determine the temperature even while the recirculation pump 28 is not running. The temperature sensor 78 determines the temperature of the water in the tank 12. The controller 58 then compares the temperature of the water in the body of water to the temperature of the water in the tank 12 to determine if the water in the tank is warmer or cooler than that in the body of water. Based on this determination, and as described hereinabove, the controller 58 sends a signal to the fill pump 18 to draw in more water and to the drain pump (whether it be a separate drain pump 38 or a different valve configuration of recirculation pump 28) to pump water out of the tank 12. The pumps 18, 28, 38 stop once the livewell water temperature is back to the baseline or if water warmer than the baseline is detected in the tank 12. If that is the case, the controller 58 may then choose to divert water to the heat exchanger 48 instead. The control panel 68 displays the current temperature of the water in the tank 12.

In the present description, certain terms have been used for brevity, clarity, and understanding. No unnecessary limitations are to be implied therefrom beyond the requirement of the prior art because such terms are used for descriptive purposes only and are intended to be broadly construed. The different components and assemblies described herein may be used or sold separately or in combination with other components and assemblies. Various equivalents, alternatives, and modifications are possible within the scope of the appended claims.

What is claimed is:

1. A livewell system comprising:
   a tank configured to hold water;
   a fill pump configured to pump water into the tank from a body of water external to the tank;
   a recirculation pump configured to pump water out of the tank and subsequently back into the tank;
   a first temperature sensor configured to sense a current temperature of the water in the body of water;
   a second temperature sensor configured to sense a current temperature of the water in the tank; and
   a controller in signal communication with the fill pump, the recirculation pump, and the first and second temperature sensors;
   wherein the controller is configured to determine which of the fill pump and the recirculation pump to operate based on a comparison between information from the first and second temperature sensors indicating a difference between the current temperature of the water in the body of water and the current temperature of the water in the tank, so as to maintain the temperature of the water in the tank within a predetermined temperature range;
   wherein, in response to determining that (a) the temperature of the water in the tank is above the predetermined temperature range and (b) the water in the body of water is cooler than the water in the tank, the controller is configured to activate the fill pump to pump water into the tank from the body of water; and
   wherein, in response to determining that (a) the temperature of the water in the tank is above the predetermined temperature range and (b) the water in the body of water is warmer than the water in the tank, the controller is configured to activate the recirculation pump to pump water out of the tank, through a heat exchanger, and subsequently back into the tank.

2. The livewell system of claim 1, wherein the first temperature sensor is located in the fill pump.

3. The livewell system of claim 2, wherein the first temperature sensor is located in a suction inlet of the fill pump.

4. The livewell system of claim 1, wherein the second temperature sensor is located in the recirculation pump.

5. The livewell system of claim 4, wherein the controller is configured to run the recirculation pump for a predetermined period of time before using the information from the second temperature sensor to operate the fill pump and the recirculation pump so as to maintain the temperature of the water in the tank within the predetermined temperature range.

6. The livewell system of claim 1, further comprising:
   a conduit downstream of the recirculation pump, wherein the recirculation pump is configured to pump water out of the tank, through the conduit, and back into the tank;
   wherein the heat exchanger is in fluid communication with the conduit and is configured to cool the water in the conduit;
   wherein the controller is configured to selectively divert water in the conduit to the heat exchanger so as to cool the water in the conduit before it is returned to the tank.

7. The livewell system of claim 6, wherein in response to determining that the temperature of the water in the tank is within the predetermined temperature range, the controller is configured to activate the recirculation pump to pump water out of the tank, through the conduit, and subsequently back into the tank, bypassing the heat exchanger.

8. The livewell system of claim 1, wherein the heat exchanger comprises a thermoelectric cooler.

9. The livewell system of claim 1, further comprising a drain pump;
   wherein the controller is configured to activate the drain pump to pump water out of the tank while activating the fill pump to pump water into the tank from the body of water.

10. The livewell system of claim 1, wherein in response to determining that (a) the temperature of the water in the tank is below the predetermined temperature range and (b) the water in the body of water is warmer than the water in the tank, the controller is configured to activate the fill pump to pump water into the tank from the body of water.

11. The system of claim 1, wherein the controller is configured to determine which of the fill pump and the recirculation pump to operate based on the relative temperatures of the water in the tank and the water in the body of water.

12. A method for a livewell system, the livewell system including a tank and at least one pump configured to pump water into and/or out of the tank, the method comprising:
determining a current temperature of water in the tank;
determining a current temperature of water in a body of water external to the tank; and
with a controller, comparing the current temperature of the water in the tank to the current temperature of the water in the body of water, and automatically operating the at least one pump based on the comparison so as to maintain the temperature of the water in the tank within a predetermined temperature range;
wherein the at least one pump includes a fill pump configured to pump water into the tank from the body of water and a recirculation pump configured to pump water out of the tank and subsequently back into the tank;
wherein the controller is configured to determine which of the fill pump and the recirculation pump to run based on the relative temperatures of the water in the tank and the water in the body of water;
wherein the controller is configured to operate the fill pump to fill the tank with water from the body of water in response to determining that (a) the temperature of the water in the tank is above the predetermined temperature range and (b) the water in the body of water is cooler than the water in the tank; and
wherein the controller is configured to operate the recirculation pump to pump water out of the tank, through a heat exchanger configured to cool the water, and subsequently back into the tank in response to determining that (a) the temperature of the water in the tank is above the predetermined temperature range and (b) the water in the body of water is warmer than the water in the tank.

13. The method of claim 12, further comprising operating the fill pump, with the controller, to fill the tank with water from the body of water in response to determining that (a) the temperature of the water in the tank is below the predetermined temperature range and (b) the water in the body of water is warmer than the water in the tank.

14. The method of claim 12, wherein determining the temperature of the water in the body of water comprises utilizing a temperature sensor located in the fill pump.

15. The method of claim 12, wherein determining the temperature of the water in the tank comprises utilizing a temperature sensor located in the recirculation pump.

16. The method of claim 15, further comprising running the recirculation pump for a predetermined period of time before comparing the temperature of the water in the tank to the temperature of the water in the body of water.

17. A livewell system comprising:
a tank configured to hold water;
a fill pump configured to pump water into the tank from a body of water external to the tank;
a recirculation pump configured to pump water out of the tank and subsequently back into the tank;
a first temperature sensor configured to sense a temperature of the water in the tank;
a second temperature sensor configured to sense a temperature of the water in the body of water; and
a controller in signal communication with the fill pump, the recirculation pump, and the first and second temperature sensors, wherein the controller is configured to:
receive, during a first period of time, a first temperature value from the first temperature sensor;
receive, during the first period of time, a second temperature value from the second temperature sensor;
compare the first temperature value to a predetermined temperature range;
determine, based on the comparison of the first temperature value and the predetermined temperature range, that the temperature of the water in the tank is above the predetermined temperature range;
in response to determining that the temperature of the water in the tank is above the predetermined temperature range, compare the first temperature value to the second temperature value;
determine, based on the comparison of the first temperature value and the second temperature value, that the water in the body of water is cooler than the water in the tank by more than a predetermined amount during the first period of time;
in response to determining that the water in the body of water is cooler than the water in the tank by more than the predetermined amount, activate the fill pump to pump water into the tank from the body of water, thereby causing the temperature of the water in the tank to decrease toward the predetermined temperature range;
receive, during a second period of time that does not overlap with the first period of time, a third temperature value from the first temperature sensor;
receive, during the second period of time, a fourth temperature value from the second temperature sensor;
compare the third temperature value to the predetermined temperature range;
determine, based on the comparison of the third temperature value and the predetermined temperature range, that the temperature of the water in the tank is above the predetermined temperature range;
in response to determining that the temperature of the water in the tank is above the predetermined temperature range, compare the third temperature value to the fourth temperature value;
determine, based on the comparison of the third temperature value and the fourth temperature value, that the water in the body of water is not cooler than the water in the tank by more than a predetermined amount based on the comparison; and
in response to determining that the water in the body of water is not cooler than the water in the tank by more than the predetermined amount, activate the recirculation pump to pump water out of the tank, through a heat exchanger, and subsequently back into the tank, thereby causing the temperature of the water in the tank to decrease toward the predetermined temperature range.

18. The system of claim 17, wherein the predetermined amount is about three degrees, such that the controller determines, based on the comparison of the first temperature value and the second temperature value, that the water in the body of water is cooler than the water in the tank by more than the predetermined amount during the first period of time based on the second temperature value being more than about three degrees below the first temperature value.

* * * * *